US012689092B2

(12) United States Patent
Jang et al.

(10) Patent No.: US 12,689,092 B2
(45) Date of Patent: Jul. 21, 2026

(54) BATTERY MODULE AND BATTERY PACK INCLUDING THE SAME

(71) Applicant: LG ENERGY SOLUTION, LTD., Seoul (KR)

(72) Inventors: Sunghwan Jang, Daejeon (KR); Junyeob Seong, Daejeon (KR); Won Kyoung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 592 days.

(21) Appl. No.: 18/270,696

(22) PCT Filed: Apr. 11, 2022

(86) PCT No.: PCT/KR2022/005217

§ 371 (c)(1),
(2) Date: Jun. 30, 2023

(87) PCT Pub. No.: WO2022/250287

PCT Pub. Date: Dec. 1, 2022

(65) Prior Publication Data

US 2024/0072375 A1    Feb. 29, 2024

(30) Foreign Application Priority Data

May 28, 2021    (KR) ......................... 10-2021-0069473

(51) Int. Cl.
H01M 50/383 (2021.01)
H01M 50/211 (2021.01)
(Continued)

(52) U.S. Cl.
CPC ....... H01M 50/383 (2021.01); H01M 50/211 (2021.01); H01M 50/296 (2021.01);
(Continued)

(58) Field of Classification Search
CPC ............ H01M 50/383; H01M 50/296; H01M 50/204; H01M 50/264; H01M 50/507
See application file for complete search history.

(56) References Cited

U.S. PATENT DOCUMENTS

2019/0061554 A1    2/2019    Brenner et al.
2019/0305287 A1    10/2019    Matsul et al.
(Continued)

FOREIGN PATENT DOCUMENTS

CN    209200023 U    8/2019
CN    209896150 U    1/2020
(Continued)

OTHER PUBLICATIONS

International Search Report for PCT/KR2022/005217 (PCT/ISA/210) mailed on Aug. 5, 2022.
(Continued)

*Primary Examiner* — Christopher P Domone
(74) *Attorney, Agent, or Firm* — Birch, Stewart, Kolasch & Birch, LLP

(57) ABSTRACT

A battery module includes a battery cell stack where a plurality of battery cells are stacked; a module frame that accommodates the battery cell stack; end plates that are positioned at one side and the other side of the battery cell stack, and having openings; a busbar frame that is positioned between the battery cell stack and the end plate; and a
(Continued)

terminal busbar that is mounted to the busbar frame, and exposed through the opening. The busbar frame includes a blocking member protruded toward the opening.

14 Claims, 7 Drawing Sheets

(51) Int. Cl.
    *H01M 50/296*     (2021.01)
    *H01M 50/507*     (2021.01)

(52) U.S. Cl.
    CPC ...... *H01M 50/507* (2021.01); *H01M 2200/10* (2013.01); *H01M 2200/20* (2013.01)

(56) References Cited

U.S. PATENT DOCUMENTS

| | | | |
|---|---|---|---|
| 2020/0176739 A1* | 6/2020 | You | H01M 50/224 |
| 2021/0126328 A1 | 4/2021 | Egashira et al. | |
| 2021/0164511 A1* | 6/2021 | Jeong | H01M 50/502 |
| 2021/0249712 A1 | 8/2021 | Lee et al. | |
| 2021/0296738 A1 | 9/2021 | Lee et al. | |
| 2021/0344074 A1 | 11/2021 | Jung et al. | |
| 2022/0029222 A1 | 1/2022 | Lee | |
| 2023/0335866 A1 | 10/2023 | Park et al. | |

FOREIGN PATENT DOCUMENTS

| | | |
|---|---|---|
| CN | 111554837 A | 8/2020 |
| CN | 111668419 A | 9/2020 |
| CN | 212033104 U | 11/2020 |
| EP | 3 817 133 A2 | 5/2021 |
| EP | 4 184 676 A1 | 5/2023 |
| JP | 2016-201333 A | 12/2016 |
| JP | 2019-175818 A | 10/2019 |
| KR | 10-2020-0067587 A | 6/2020 |
| KR | 10-2020-0080078 A | 7/2020 |
| KR | 10-2020-0104143 A | 9/2020 |
| KR | 10-2020-0110081 A | 9/2020 |
| KR | 10-2020-0138526 A | 12/2020 |
| KR | 10-2021-0002919 A | 1/2021 |
| WO | WO 2020/003801 A1 | 1/2020 |
| WO | WO 2020/138821 A1 | 7/2020 |

OTHER PUBLICATIONS

Extended European Search Report for European Application No. 22811480.7, dated Feb. 13, 2025.

* cited by examiner

【Figure 1】
<u>100</u>
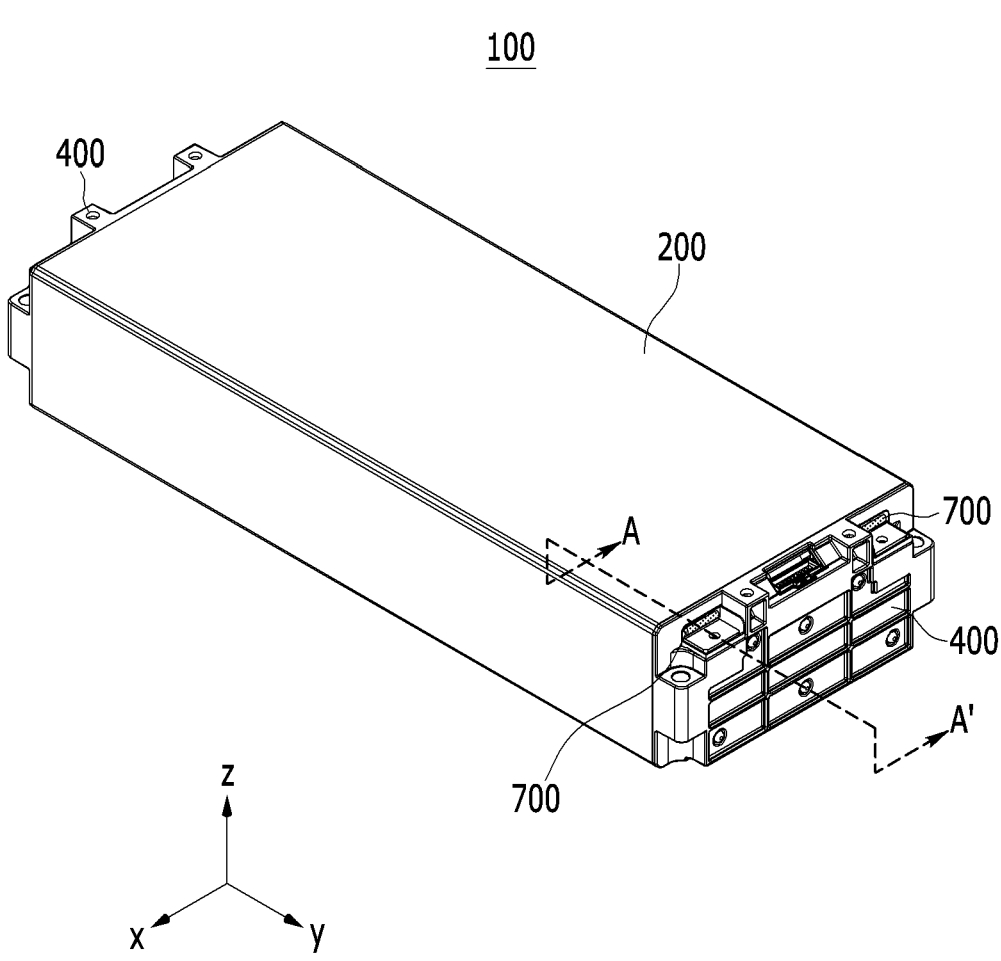

【Figure 2】
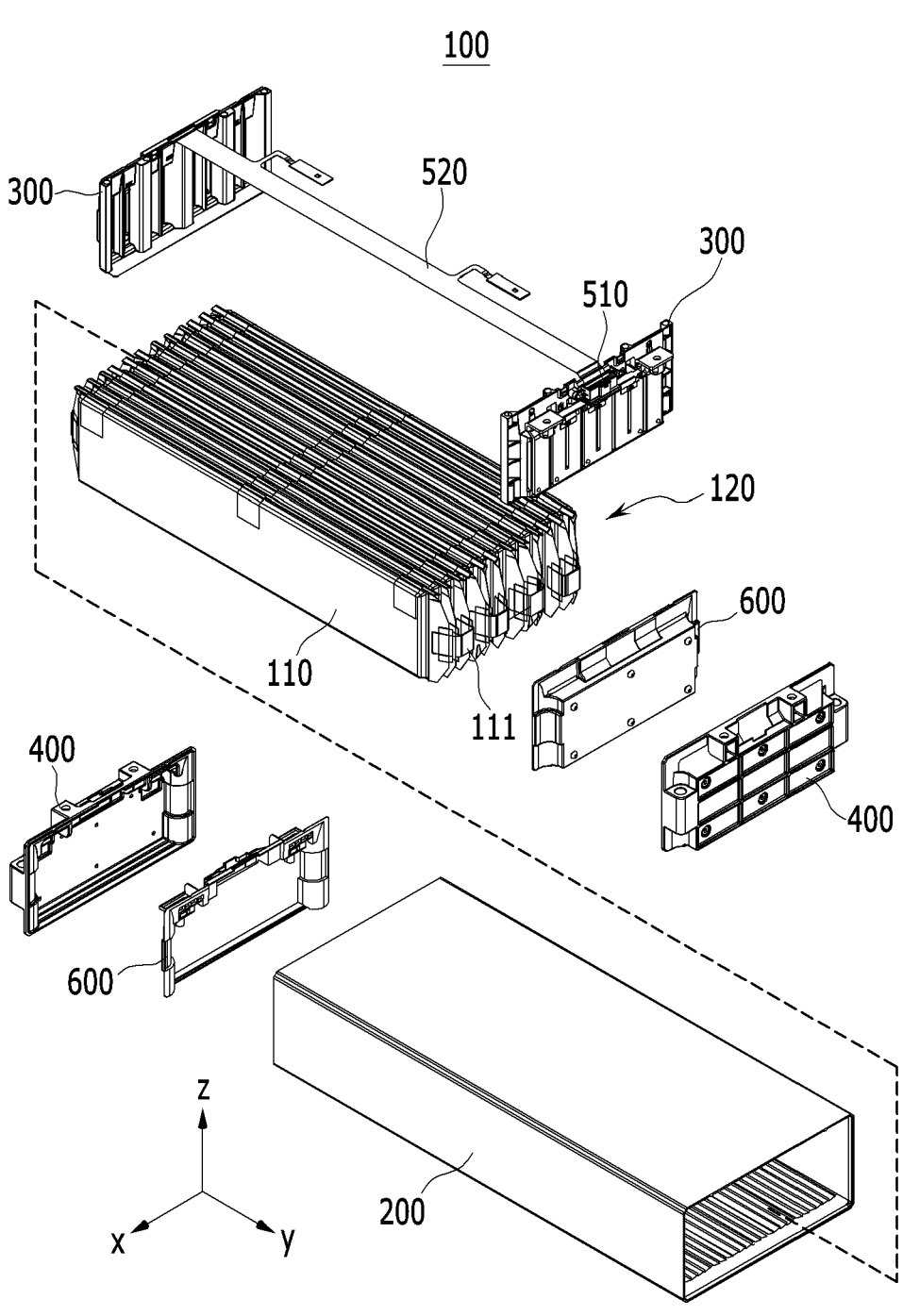

【Figure 3】
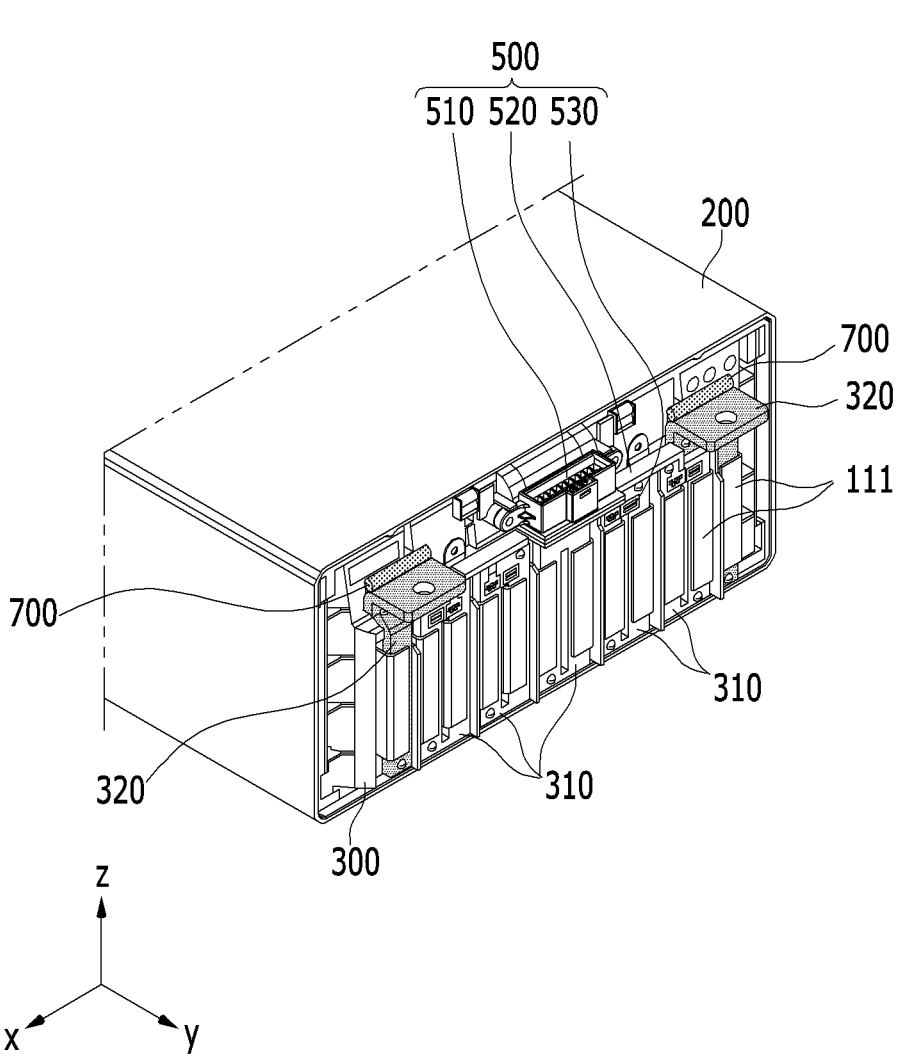

【Figure 4】
(a)                                          (b)
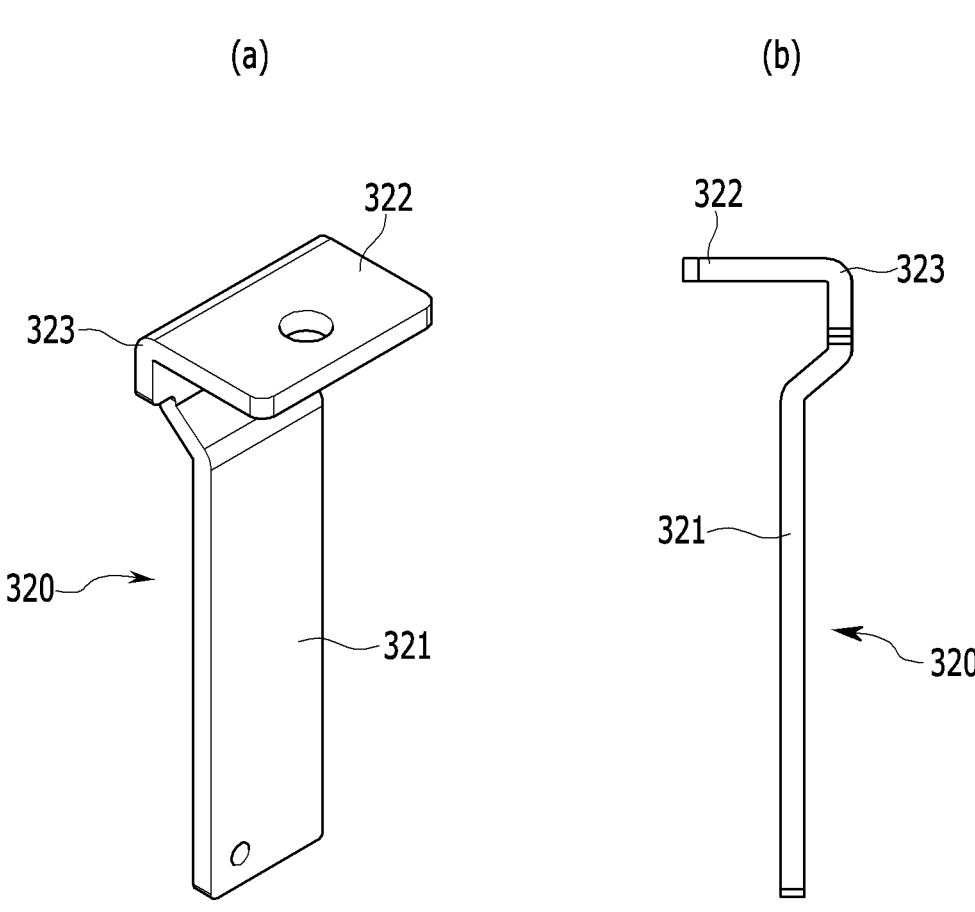

【Figure 5】
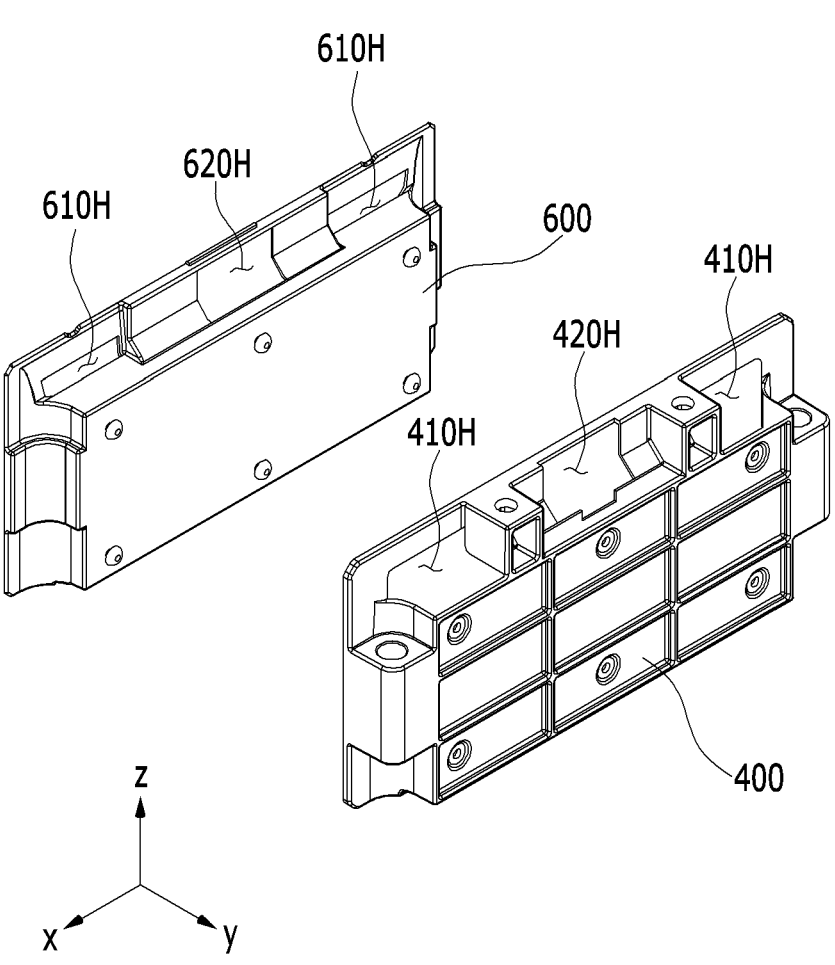

【Figure 6】
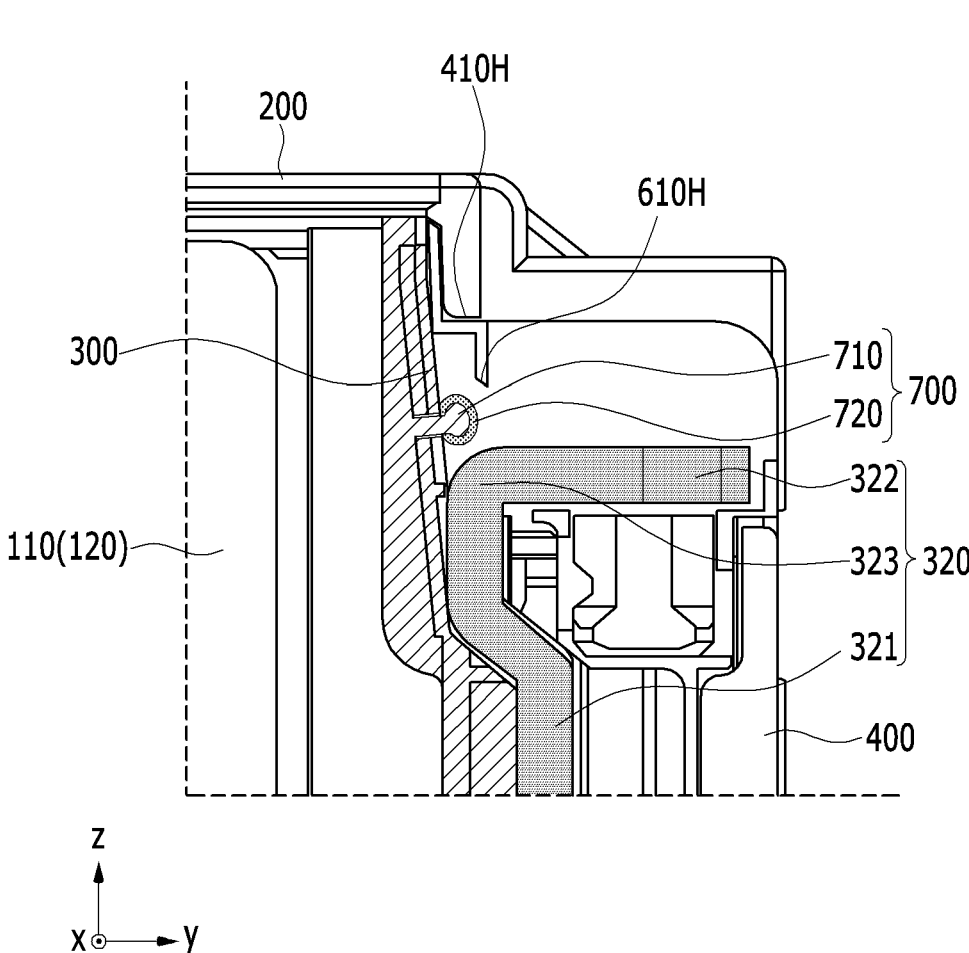

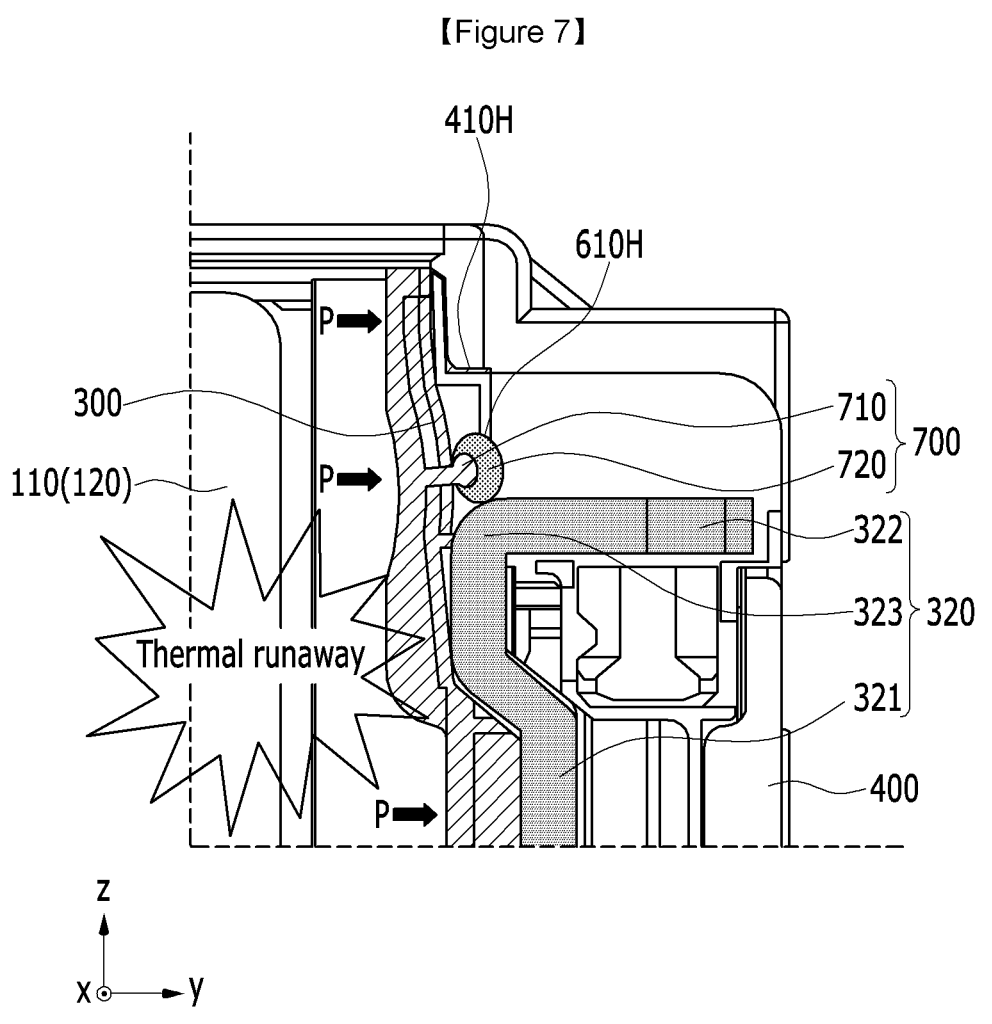

【Figure 7】

BATTERY MODULE AND BATTERY PACK INCLUDING THE SAME

CROSS-REFERENCE TO RELATED APPLICATION

This application claims priority to and the benefit of Korean Patent Application No. 10-2021-0069473 filed in the Korean Intellectual Property Office on May 28, 2021, the entire contents of which are incorporated herein by reference.

TECHNICAL FIELD

The present invention relates to a battery module and a battery pack including the same, and more particularly, it relates to a battery module that can suppress propagation of thermal runaway, and a battery pack including the same.

BACKGROUND ART

In modern society, as portable devices such as mobile phones, laptops, camcorders, and digital cameras are used in daily life, the development of technologies related to mobile devices as described above is becoming active. In addition, since a rechargeable batteries that can be charged and discharged is being used as a power source of electric vehicles (EV), hybrid electric vehicles (HEV), and plug-in hybrid electric vehicles (P-HEV), the need for rechargeable battery development is increasing as a method for solving air pollution of conventional gasoline vehicles that use fossil fuels.

Currently commercially available rechargeable batteries include a nickel cadmium battery, a nickel hydrogen battery, a nickel zinc battery, and a lithium rechargeable battery, and the lithium rechargeable battery is attracting attention for its merits of charging and discharging freely, its self-discharge rate is very low, and its energy density is high because it has almost no memory effect compared to the nickel-based rechargeable battery.

The lithium rechargeable battery mainly uses a lithium-based oxide and a carbon material as positive and negative active materials, respectively. A lithium rechargeable battery includes an electrode assembly in which the positive and negative electrode plates are respectively coated with these positive and negative active materials with a separator interposed therebetween, and an exterior material that seals and houses the electrode assembly together with an electrolyte solution, that is, a battery case.

In general, a lithium rechargeable battery can be classified into a can-type rechargeable battery in which the electrode assembly is built into a metal can and a pouch-type secondary battery in which the electrode assembly is built in a pouch of an aluminum laminate sheet according to the shape of the exterior material.

In the case of a rechargeable battery used in small devices, two to three battery cells are disposed, but in the case of a rechargeable battery used in a medium or large device such as an automobile, a battery module in which a plurality of battery cells are electrically connected is used. In such a battery module, a plurality of battery cells are coupled serially or in parallel to form a battery cell stack, and thus capacity and output are improved. In addition, at least one battery module may be mounted together with various control and protection systems such as a battery management system (BMS) and a cooling system to form a battery pack.

In a battery pack in which a plurality of battery modules are gathered, heat from a plurality of battery cells is added up in a narrow space, and the temperature may rise rapidly and severely. In other words, in the case of battery modules in which a plurality of battery cells are stacked and a battery pack in which the battery modules are mounted, high output may be obtained, but it is not easy to remove heat generated from the battery cells during charging and discharging. When the heat dissipation of the battery cell is not performed properly, the deterioration of the battery cell is accelerated, the cycle-life is shortened, and the possibility of explosion or ignition increases.

Moreover, in the case of a battery module included in a vehicle battery pack, it is frequently exposed to direct sunlight and may be subjected to high temperature conditions such as summer or desert areas. In addition, since a plurality of battery modules are intensively disposed to increase the mileage of the vehicle, a thermal runaway phenomenon occurring in one battery module is easily propagated to a neighboring battery module, and ultimately the battery pack itself is damaged, thereby causing firing or explosion.

Therefore, it is necessary to design a model that does not lead to fire or explosion of the battery pack itself, even though a thermal runaway phenomenon occurs in one battery module.

DISCLOSURE

Technical Problem

The problem to be solved by the present invention is to provide a battery module that can suppress ejection of high temperature gas and flame even when a thermal runaway phenomenon occurs within the battery module and, a battery pack including the same.

However, the problems to be solved by the embodiments of the present invention are not limited to the above-described problems and can be variously expanded in the range of technical ideas included in the present invention.

Technical Solution

A battery module according to an embodiment of the present invention includes: a battery cell stack where a plurality of battery cells are stacked; a module frame that accommodates the battery cell stack; end plates positioned at a first side and a second side of the battery cell stack, at least one end plate of the end plates having an opening; a busbar frame that is positioned between the battery cell stack and the at least one end plate; and a terminal busbar mounted to the busbar frame, and exposed through the opening. The busbar frame includes a blocking member protruded toward the opening.

The blocking member may be positioned between the terminal busbar and an inner side of the opening.

The blocking member may be formed in a portion of the busbar frame, corresponding to the opening.

The blocking member may include a protruded portion protruded from one side of the busbar frame and a blocking portion surrounding the protruded portion.

The blocking portion may include at least one of a foam material and a resin material.

The blocking portion may include at least one of an epoxy-based resin, a vinyl chloride-based resin, and a fluorine-based resin.

The terminal busbar may be mounted on a first side of the busbar frame facing the at least one end plate, and the blocking member may be positioned on the first side of the busbar frame.

The battery module may further include an insulation cover positioned between the busbar frame and the at least one end plate. An opening hole may be formed in a portion of the insulation cover, corresponding to the opening.

The blocking member may be positioned between the terminal busbar and an inner side of the opening hole.

The terminal busbar may include a first portion connected with an electrode lead of a battery cell of the plurality of battery cells and a second portion exposed to the outside through the opening.

The terminal busbar may further include a bending portion formed between the first portion and the second portion. The blocking member may be positioned between an inner side of the opening and the bending portion, or between the inner side of the opening and the second portion.

The blocking member may expand when heated.

The blocking member may expand to contact a surface of the terminal busbar and an edge of the opening.

Advantageous Effects

According to the embodiment of the present invention, when a thermal runaway phenomenon occurs in the battery module, the pressure inside the battery module increases, and accordingly, the blocking member may block a gap formed in the battery module. That is, the gap where high temperature gas and flame may be ejected can be offset by using the increase in pressure inside the battery module.

Effects of the present invention are not limited to the effects mentioned above, and other effects not mentioned will be clearly understood by a person of an ordinary skill in the art from the description of the claimed range.

DESCRIPTION OF THE DRAWINGS

FIG. 1 is a perspective view of a battery module according to an embodiment of the present invention.

FIG. 2 is an exploded perspective view of the battery module of FIG. 1.

FIG. 3 is a perspective view of a state in which an end plate and an insulation cover are removed from the battery module according to the embodiment of the present invention.

(a) and (b) of FIG. 4 show a terminal busbar included in the battery module of FIG. 3.

FIG. 5 is a perspective view of the end plate and the insulation cover according to the embodiment of the present invention.

FIG. 6 and FIG. 7 are partial cross-sectional views of FIG. 1, taken along the line A-A'.

MODE FOR INVENTION

Hereinafter, with reference to the accompanying drawing, various embodiments of the present invention will be described in detail and thus a person of an ordinary skill can easily perform it in the technical field to which the present invention belongs. The present invention may be implemented in several different forms and is not limited to the embodiments described herein.

In order to clearly explain the present invention, parts irrelevant to the description are omitted, and the same reference sign is attached to the same or similar constituent elements throughout the specification.

In addition, since the size and thickness of each component shown in the drawing are arbitrarily indicated for convenience of explanation, the present invention is not necessarily limited to the illustrated contents. In the drawings, the thickness of layers, films, panels, regions, etc., are exaggerated for clarity. In addition, in the drawing, for convenience of explanation, the thickness of some layers and regions is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

In addition, unless explicitly described to the contrary, the word "comprise", and variations such as "comprises" or "comprising", will be understood to imply the inclusion of stated elements but not the exclusion of any other elements.

Throughout the specification, the word "in a plan view" means when an object is viewed from above, and the word "in a cross-sectional view" means when a cross section made by vertically cutting an object is viewed from a lateral side.

FIG. 1 is a perspective view of a battery module according to an embodiment of the present invention. FIG. 2 is an exploded perspective view of the battery module of FIG. 1.

Referring to FIG. 1 and FIG. 2, a battery module 100 according to an embodiment of the present invention includes: a battery cell stack 120 where a plurality of battery cells 110 are stacked; a module frame 200 that accommodates the battery cell stack 120; and end plates 400 disposed at one end and the other end of the battery cell stack 120.

First, the battery cell 110 may be a pouch-type battery cell. The battery cell 110 may be formed in a rectangular sheet-like structure. For example, the battery cell 110 according to the present embodiment may have a structure in which two electrode leads 111 face each other and protrude to one side and the other side, respectively. In more detail, the electrode lead 111 is connected to the electrode assembly (not shown), and protruded from the electrode assembly (not shown) to the outside of the battery cell 110.

On the other hand, the battery cell 110 may be manufactured by heat-sealing the exterior circumference of the pouch-type cell case in a state where the electrode assembly (not shown) is accommodated in the pouch-type cell case. The pouch-type cell case may be formed of a laminate sheet including a resin layer and a metal layer.

On the other hand, although only the battery cell 110 having a structure in which the electrode lead 111 is protruded in both directions of one side and the other side has been described, as another embodiment of the present invention, a single-direction pouch-type battery cell in which the electrode lead 111 is protruded together in one direction is also possible.

The battery cells 110 are configured in a plurality, and a plurality of battery cells 110 are stacked in one direction to be electrically connected to each other to form the battery cell stack 120. For example, as shown in FIG. 2, the plurality of battery cells 110 may be stacked in a direction that is parallel to the x-axis. The pouch-type cell case is generally formed of a laminate structure of a resin layer/metal thin film layer/resin layer. For example, when the surface of the pouch-type cell case is formed of an O (oriented)-nylon layer and when a plurality of battery cells 110 are stacked to form a medium or large battery module, it is not easily slid by external impact. Therefore, in order to prevent such a problem and maintain a stable stacking structure of battery cells, an adhesive member such as a double-sided adhesive tape or a chemical adhesive bonded by a chemical reaction during adhesion is used on the surface of the pouch-type cell case may attached to form a battery cell stack 120.

The battery cell stack 120 is accommodated in the module frame 200. The module frame 200 may be a metal frame with both sides open. More specifically, the module frame 200 may be opened in both directions in which the electrode lead 111 is protruded based on the battery cell stack 120. However, the module frame 200 shown in FIG. 2 is an example of the structure, and as long as it can accommodate the battery cell stack 120, there is no particular limitation in its form. The module frame 200 of FIG. 2 is shown as a mono frame in the form of a metal plate in which an upper side, a lower side, and lateral sides are integrated, but any form in which an upper cover is joined to an open U-shaped frame or a form in which a U-shaped frame and an inverted U-shaped frame are combined with each other is possible.

The end plates 400 are positioned on one side and the other side of the battery cell stack 120. That is, the end plates 400 may be positioned on open lateral sides of the module frame 200.

The module frame 200 and the end plate 400 may be joined by a welding method while the corresponding corners are in contact with each other. However, this is an example of the method, and bolt fastening, hook fastening, and the like may be applied as a mechanical coupling form. Since the battery cell stack 120 is accommodated in a space formed by the module frame 200 and the end plates 400, the battery cell stack 120 can be physically protected. For this purpose, the module frame 200 and the end plate 400 may include a metal material having predetermined strength such as aluminum or a plastic material.

Meanwhile, the battery module 100 according to the present embodiment includes a busbar frame 300 positioned between the battery cell stack 120 and the end plate 400. In addition, the battery module 100 may include an insulation cover 600 positioned between the busbar frame 300 and the end plate 400. That is, the busbar frame 300, the insulation cover 600, and the end plate 400 may be sequentially positioned from the battery cell stack 120 to the outside. Like the end plate 400, the busbar frame 300 and the insulation cover 600 may each be configured in a plurality.

Hereinafter, referring to FIG. 3 to FIG. 5, an opening formed in a terminal busbar and the end plate according to the present embodiment will be described in detail.

FIG. 3 is a perspective view of a state in which the end plate and the insulation cover are removed from the battery module according to the embodiment of the present invention. In FIG. 4, (a) and (b) show a terminal busbar included in the battery module of FIG. 3. FIG. 5 is a perspective view of the end plate and the insulation cover according to the embodiment of the present invention.

Referring to FIG. 2 to FIG. 5, the battery module 100 according to the embodiment of the present invention includes a busbar 320 mounted in the busbar frame 300. In particular, an opening 410H is formed in the end plate 400, and the terminal busbar 320 is exposed to the outside of the battery module 100 through the opening 410H.

More specifically, the battery module 100 according to the present embodiment may include a busbar 310 and a terminal busbar 320. The busbar 310 and the terminal busbar 320 may be mounted on the busbar frame 300.

The busbar 310 and the terminal busbar 320 may be joined to the electrode lead 111 of the battery cell 110 to electrically connect a plurality of battery cells 110. Specifically, the busbar frame 300 equipped with the busbar 310 and the terminal busbar 320 may be positioned on one side (y-axis direction) and the other side (−y-axis direction) of the battery cell stack 120, respectively. One side (y-axis direction) and the other side (−y-axis direction) of the battery cell stack 120 correspond to a direction in which the electrode lead 111 of the battery cell 110 is protruded. That is, as described above, any one busbar frame 300 may be positioned between any one of the end plates 400 and the battery cell stack 120.

A lead slit is formed in the busbar frame 300, and the electrode lead 111 of the battery cell 110 passes through the lead slit and is bent to be bonded to the busbar 310 or the terminal busbar 320. As long as physical and electrical connection is possible, there is no particular limitation on a method of bonding, and for example, welding bonding can be used. That is, the battery cells 110 may be electrically connected to each other via the busbar 310.

On the other hand, a part of the terminal busbar 320 is exposed to the outside of the battery module 100. Specifically, an opening 410H is formed on the end plate 400, and a portion of the terminal busbar 320 is exposed through the opening 410H. More specifically, the terminal busbar 320 may include a first portion 321 connected to the electrode lead 111 of the battery cell 110 and a second portion 322 exposed to the outside through an opening 410H.

The second portion 322 exposed to the outside of the battery module 100 may be connected to another battery module or a battery disconnect unit (BDU) to form a high voltage (HV) connection. Here, the HV connection is a connection that serves as a power source for supplying power, and refers to a connection between battery cells or a connection between battery modules. That is, the battery module 100 may be electrically connected to another neighboring battery module via the terminal busbar 320.

Meanwhile, the battery module 100 according to the present embodiment may further include a sensing assembly 500. Here, the sensing assembly 500 is provided for a low voltage (LV) connection, and the LV connection implies a sensing connection for sensing and controlling a voltage and a temperature of a battery cell. The voltage information and temperature information of the battery cell 110 may be measured through the sensing assembly 500 and transmitted to an external BMS (Battery Management System). The sensing assembly 500 according to the present embodiment may include a module connector 510, a connection cable 520, and a bonding member 530.

The module connector 510 is a configuration for transmitting and receiving signals to and from an external control device. A connector opening 420H is formed on the end plate 400, the module connector 510 is exposed to the outside of the battery module 100 through the connector opening 420H, and the module connector 510 may be connected to an external BMS.

The connection cable 520 is a configuration for connecting the module connector 510 and the bonding member 530, and may be a flexible printed circuit board (FPCB) or a flexible flat cable (FFC). The module connector 510 and connection cable 520 may be positioned on top of the busbar frame 300.

The bonding member 530 may be connected to one end of the connection cable 520, and the bonding member 530 may be bonded to one side of the busbar 310 by a welding method.

Voltage information for the plurality of battery cells 110 may be sequentially transmitted through the bonding member 530, the connection cable 520 and the module connector 510 to the external BMS.

Meanwhile, as shown in FIG. 2, two busbar frames 300 may be disposed on one side and the other side of the battery cell stack 120, respectively. In this case, the module connector 510 may be positioned only in one busbar frame 300, and the module connector may not be positioned in the other busbar frame 300. The connection cable 520 may be extended from the module connector 510 to another busbar frame 300 such that the module connector 510 may be connected with the busbars 310 positioned on another busbar frame 300. An extended portion of the connection cable 520 may be positioned on the top of the battery cell stack 120. A temperature sensor may be provided on a part of the connection cable 520 positioned on an upper portion of the battery cell stack 120. Through the temperature sensor, the temperature information inside the battery module 100 may be sequentially transmitted through the connection cable 520 and the module connector 510 to the external BMS.

In the above manner, the sensing assembly 500 may detect and control phenomena such as overvoltage, overcurrent, and overheating of each battery cell 110.

Meanwhile, as described above, the battery module 100 according to the present embodiment may include an insulation cover 600 positioned between the busbar frame 300 and the end plate 400. The insulation cover 600 is preferably provided in plural. The insulation cover 600 may contain a material that is electrically insulating and blocks contact of the busbar 310 or the terminal busbar 320 with the end plate 400.

Referring to FIG. 3 to FIG. 5, an opening hole 610H may be formed in a portion corresponding to the opening 410H of the end plate 400 among the insulation cover 600. In addition, the connector opening hole 620H may be formed in a portion corresponding to the connector opening 420H of the end plate 400 of the insulation cover 600.

The terminal busbar 320 according to the present embodiment may be exposed to the outside of the battery module 100 through the opening hole 610H of the insulation cover 600 and the opening 410H of the end plate 400. In addition, the module connector 510 may be exposed to the outside of the battery module 100 through the connector opening hole 620H of the insulation cover 600 and the connector opening 420H of the end plate 400.

On the other hand, the terminal busbar 320 is provided in plural, one of which may function as a positive terminal of the battery module 100, and the other may function as a negative terminal of the battery module 100. Accordingly, each of the opening 410H and the opening hole 610H may be provided in plural.

Hereinafter, referring to FIG. 6 and FIG. 7, a blocking member according to an embodiment of the present invention will be described in detail.

FIG. 6 and FIG. 7 are partial cross-sectional views of FIG. 1, taken along the line A-A'. In this case, FIG. 6 is a cross-sectional view of the battery module in a normal condition, and FIG. 7 is a cross-sectional view of a case that a thermal runaway occurs in the battery module.

Referring to FIG. 3, FIG. 4, FIG. 6, and FIG. 7, the busbar frame 300 according to the embodiment of the present invention may include a blocking member 700 protruded toward the opening 410H. The blocking member 700 may be positioned inside the opening 410H.

Specifically, the blocking member 700 may be formed in a portion corresponding to the opening 410H of the end plate 400 of the busbar frame 300. The terminal busbar 320 is mounted on one side of the busbar frame 300, and the blocking member 700 may be positioned on the side of the busbar frame 300. Particularly, the blocking member 700 may have a shape protruded toward the opening 410H on the one side of the busbar frame 300, and may be positioned between the terminal busbar 320 and an inner side of the opening 410H.

A thermal runaway phenomenon may occur in the battery cells 110 inside the battery module 100. An example of a thermal runaway phenomenon is as follows. Physical, thermal, and electrical damage may occur to the battery cell 110 including overcharge, and the internal pressure of the battery cell 110 may increase. When the fusion strength limit of the pouch-type cell case of the battery cell 110 is exceeded, high temperature heat and venting gas generated in the battery cell 110 may be ejected to the outside of the battery cell 110.

The thermal runaway phenomenon occurring in one battery cell may be extended to other battery cells due to the convection effect, and eventually high temperature gas and flame may be generated inside the battery module 100. The generated high-temperature gas and flame may be ejected to the outside through the opening 410H of the end plate 400, causing damage to an adjacent battery module or inducing another thermal runaway phenomenon in the adjacent battery module. Ultimately, a thermal runaway phenomenon propagates to a plurality of battery modules, which may cause explosion and ignition of the battery pack.

Accordingly, in the battery module 100 according to the present embodiment, the blocking member 700 capable of blocking the opening 410H of the end plate 400 according to the increase in the internal pressure of the module frame 200 is provided inside the opening 410H. An internal pressure of the module frame 200 means an air pressure of the inner space of the module frame 200 in which the battery cell stack 120 is accommodated. The increase in the internal pressure of the module frame 200 means that a large amount of gas is generated in the inner space of the module frame 200 due to the thermal runaway phenomenon.

During thermal runaway, gas is ejected from the battery cells, and the internal pressure of the module frame 200 is increased. As the internal pressure is increased, the busbar frame 300 may be closely adhered to the end plate 400 side. In addition, a portion of the busbar frame 300 may be bent toward the end plate 400 by an internal pressure P of the module frame 200. In FIG. 7, for the convenience of explanation, such a figure is expressed exaggeratedly.

Due to the increase of the internal pressure of the module frame 200, the blocking member 700 positioned inside the opening 410H approaches the opening 410H, and eventually the gap between the opening 410H and the terminal busbar 320 may be closed. Accordingly, it is possible to suppress the ejection of high temperature gas or flame to the outside of the battery module 100. That is, the gap where high temperature gas and flame may be ejected can be offset by increasing the internal pressure of the battery module 100. Accordingly, it is possible to prevent the thermal runaway phenomenon occurring in one battery module from propagating to other battery modules.

As described above, the terminal busbar 320 may include a first portion 321 connected to the electrode lead 111 of the battery cell 110 and a second portion 322 exposed to the outside through the opening 410H. In addition, the terminal busbar 320 may further include a bending portion 323 formed between the first portion 321 and the second portion 322. Accordingly, one surface of the first portion 321 and one surface of the second portion 322 may be perpendicular to each other.

The blocking member 700 according to the present embodiment may be positioned between the inner side of the opening 410H and the bending portion 323, or between the inner side of the opening 410H and the second portion 322. Although not specifically illustrated, the terminal busbar 320 may be connected to another battery module or a battery disconnect unit (BDU) via a connection member (not shown). The terminal busbar 320 and the connecting member (not shown) may be bonded by a method such as welding. In this case, one side of the second part 322 is disposed side by side with the ground by forming the bent bending portion 323 on the terminal busbar 320, and thus bonding of the second part 322 and the connecting member (not shown) can be facilitated.

According to the above structure, a gap is naturally formed between the inner side of the opening 410H and the bending portion 323 or between the inner side of the opening 410H and the second portion 322, and high temperature gas and flame are intensively ejected through the gap.

The blocking member 700 is positioned inside of opening 410H, particularly, between the inner side of opening 410H and the bending portion 323 or between the inner side of opening 410H and the second portion 322, and thus, when the internal pressure of module frame 200 is increased, the blocking member 700 can close the gap.

On the other hand, as described above, the battery module 100 according to the present embodiment may further include the insulation cover 600 positioned between the busbar frame 300 and the end plate 400, and an opening hole 610H may be formed in the portion corresponding to the opening 410H of the insulation cover 600. In addition, the terminal busbar 320 may be exposed to the outside of the battery module 100 through the opening hole 610H of the insulation cover 600 and the opening 410H of the end plate 400.

In this case, the opening hole 610H may be smaller than the opening 410H to ensure insulation, and an inner side of the opening hole 610H may be positioned closer to the terminal busbar 320 than the inner side of the opening 410H. The blocking member 700 according to the present embodiment may be positioned between the terminal busbar 320 and the inner side of the opening hole 610H. More specifically, the blocking member 700 may be positioned between the inner side of the opening hole 610H and the bending portion 323, or between the inner side of the opening hole 610H and the second portion 322. Therefore, when the thermal runaway phenomenon occurs, as the internal pressure of the module frame 200 is increased, the blocking member 700 becomes close to the opening hole 610H, and the gap between the opening hole 610H and the terminal busbar 320 can be closed. Due to such an operation principle of the blocking member 700, high temperature gas or flame can be prevented from being ejected to the outside of the battery module 100.

The shape of the blocking member 700 preferably corresponds to the opening area of the opening 410H or the opening hole 610H. For example, referring to FIG. 3 and FIG. 5, according to the shape of the opening of the opening hole 610H having a wider width in the horizontal direction than a width in the vertical direction, the blocking member 700 may have a shape extending along the horizontal direction.

The blocking member 700 according to the present embodiment may include a protruded portion 710 protruded from one side of the busbar frame 300 and a blocking portion 720 surrounding the protruded portion 710. Specifically, the busbar frame 300 may be an insulating plastic member, and may be manufactured by injection molding as an example. In this case, the protruded portion 710 may be designed to be formed on one side of the busbar frame 300 during the injection molding process. That is, the protruded portion 710 may be integrated with the busbar frame 300.

The blocking portion 720 may include at least one of a foam-type material and a resin material. It is possible to manufacture the blocking member 700 according to the present embodiment by covering the blocking portion 720 on the protruded portion 710. On the other hand, it is preferable that the foam material and the resin material are nonflammable.

In addition, the blocking portion 720 may include at least one of an epoxy-based resin, a vinyl chloride-based resin, and a fluorine-based resin. Referring to FIG. 6 and FIG. 7, the internal temperature of the battery module 100 may increase when a thermal runaway phenomenon occurs, and the blocking portion 720 may expand according to the temperature increase. Although it is exaggerated for convenience of explanation, but in FIG. 7, the blocking portion 720 is expanded more than the blocking portion 720 shown in FIG. 6. The expanded blocking portion 720 is more effective in closing the gap between the opening 410H and the terminal busbar 320 or between the opening hole 610H and the terminal busbar 320.

In the present embodiment, terms indicating direction such as before, after, left, right, up, and down were used, but these terms are for convenience of explanation only, and may vary depending on the position of the object or the position of the observer.

One or more battery modules according to the present embodiment described above may be mounted together with various control and protection systems such as a battery management system (BMS), a battery disconnect unit (BDU), and a cooling system to form a battery pack.

The battery module or battery pack can be applied to various devices. Specifically, it can be applied to transportation means such as electric bicycles, electric vehicles, hybrids, or energy storage system (ESS), but is not limited thereto and can be applied to various devices that can use rechargeable batteries.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module

120: battery cell stack

200: module frame

300: busbar frame

320: terminal busbar

400: end plate

410H: opening

700: blocking member

US 12,689,092 B2

11

The invention claimed is:

1. A battery module comprising:
a battery cell stack where a plurality of battery cells are stacked;
a module frame that accommodates the battery cell stack;
end plates positioned at a first side and a second side of the battery cell stack, at least one end plate of the end plates having an opening;
a busbar frame positioned between the battery cell stack and the at least one end plate; and
a terminal busbar mounted to the busbar frame, and exposed through the opening,
wherein the busbar frame comprises a blocking member protruded toward the opening.

2. The battery module of claim 1, wherein the blocking member is positioned between the terminal busbar and an inner side of the opening.

3. The battery module of claim 1, wherein the blocking member is formed in a portion of the busbar frame, corresponding to the opening.

4. The battery module of claim 1, wherein the blocking member comprises a protruded portion protruded from one side of the busbar frame and a blocking portion surrounding the protruded portion.

5. The battery module of claim 4, wherein the blocking portion comprises at least one of a foam material and a resin material.

6. The battery module of claim 4, wherein the blocking portion comprises at least one of an epoxy-based resin, a vinyl chloride-based resin, and a fluorine-based resin.

7. The battery module of claim 1, wherein:
the terminal busbar is mounted on a first side of the busbar frame facing the at least one end plate, and
the blocking member is positioned on the first side of the busbar frame.

8. The battery module of claim 1, further comprising an insulation cover positioned between the busbar frame and the at least one end plate,
wherein an opening hole is formed in a portion of the insulation cover, corresponding to the opening.

9. The battery module of claim 8, wherein the blocking member is positioned between the terminal busbar and an inner side of the opening hole.

10. The battery module of claim 1, wherein the terminal busbar comprises a first portion connected with an electrode lead of a battery cell of the plurality of battery cells and a second portion exposed to the outside through the opening.

11. The battery module of claim 10, wherein:
the terminal busbar further comprises a bending portion formed between the first portion and the second portion, and
the blocking member is positioned between an inner side of the opening and the bending portion, or between the inner side of the opening and the second portion.

12. A battery pack comprising the battery module of claim 1.

13. The battery module of claim 1, wherein the blocking member expands when heated.

14. The battery module of claim 1, wherein the blocking member expands to contact a surface of the terminal busbar and an edge of the opening.

* * * * *